United States Patent
Buis et al.

(10) Patent No.: US 6,731,396 B1
(45) Date of Patent: May 4, 2004

(54) METHOD AND SYSTEM FOR MEDIA SELECTION IN A PRINTER

(75) Inventors: Roger Lee Buis, Longmont, CO (US); Reinhard Heinrich Hohensee, Boulder, CO (US); Susan Cheryl McElrafth, Longmont, CO (US); David Earl Stone, Longmont, CO (US); Nancy Elizabeth Wood, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/464,461

(22) Filed: Dec. 14, 1999

(51) Int. Cl.[7] ............................................. G06F 15/00
(52) U.S. Cl. ..................... 358/1.15; 358/1.12; 358/296
(58) Field of Search ............................... 358/1.12, 1.13, 358/1.14, 1.15, 296, 442, 1.2, 1.6, 1.9, 449, 453, 467

(56) References Cited

U.S. PATENT DOCUMENTS

| | | | |
|---|---|---|---|
| 5,634,134 A | 5/1997 | Kumai et al. ................ | 395/798 |
| 5,644,685 A | 7/1997 | Baehr .......................... | 395/111 |
| 5,768,483 A | 6/1998 | Maniwa et al. .............. | 395/114 |
| 5,815,764 A | 9/1998 | Tomory ......................... | 399/1 |
| 5,845,057 A * | 12/1998 | Takeda et al. .............. | 358/1.15 |
| 5,850,511 A | 12/1998 | Stoecker et al. ........ | 395/183.14 |
| 6,353,479 B1 * | 3/2002 | Lubawy et al. ............ | 358/1.13 |
| 6,504,627 B1 * | 1/2003 | Matsumooto et al. ....... | 358/448 |

* cited by examiner

Primary Examiner—Mark Wallerson
(74) Attorney, Agent, or Firm—Scott W. Reid; Bracewell & Patterson, LLP

(57) ABSTRACT

A registry is established in document presentation architecture that provides a unique numeric identifier for the most commonly used media types. Logic checks a print job and the accompanying form definition for a numeric identifier, a media name and a bin number in that order. Use of a numeric identifier eliminates ambiguity, caused by character matching that is utilized when using a media name identifier, between a request and printer media availability. Logic then attempts to find a matching numeric media identifier, a matching media name or a matching media bin in that order. If no matching identifier or name is found, the print server directs the media request to the default bin of the printer.

18 Claims, 3 Drawing Sheets

METHOD AND SYSTEM FOR MEDIA SELECTION IN A PRINTER

BACKGROUND OF THE INVENTION

1. Technical Field

The present invention relates in general to data processing systems and in particular to utilizing a printer system within a data processing system. More particularly, the present invention relates to specifying paper type for particular printing jobs generated within the data processing system.

2. Description of the Related Art

Current printing systems utilized with networked data processing systems usually have media bins that are distinguished by an identifier. These bins contain media that is identified by a media name. Printing jobs generally select a printer and either a bin containing the proper media required for the job or a media name that identifies the desired media. If the bin is not-known by the print job generator and a particular media is requested by name, ambiguities may result. For instance, is A4 white the same as A4 White? If a printing system matches character strings to determine a requested media, "A4 White" would not be available as a media type if "A4 white" is the stored identifying character string. The character string identifier method suffers from the ambiguity problems inherent in character strings. Such problems are compounded when print jobs, with media name references are interchanged among systems in countries with different languages. For example, in this age of Internet communications and Wide Area Networks (WAN), if a print job is generated in the United States and references "A4 white" as the desired media, it is likely that the reference will be resolved improperly if the print job is sent to a printer in Japan or Germany due to language differences.

In most networked data processing systems, a printer server utilizes a specific system printer and a specific bin as requested by a computer on the network. This limits system capability since only one printer and bin containing media is automatically selected and any other printer and bin must be manually selected. Generally, the system does not search nor is able to respond with all available printing resources on the network that contain the desired media. Therefore, a print job may be applied to the wrong media or delayed because a bin is empty since the communications between the printer system and the computer is limited to a specific printer.

Accordingly, what is needed is a system and method that identifies specific bins on printing systems that contain identified media. Additionally, a system and method is needed that will provide a dialogue with a network print server that will identify each media source and provide information about the source including bin numbers, media names corresponding to the bin numbers and an identifier that eliminates the ambiguities related to character string matching.

SUMMARY OF THE INVENTION

It is therefore one object of the present invention to provide a method and system that will improve media identification and selection in a printing system with multiple choices for print media.

It is another object of the present invention to provide a method and system to provide positive identification of media sources within a printing system.

It is yet another object of the present invention to provide a method and system that will provide an accurate and flexible media source designation scheme.

The foregoing objects are achieved as is now described. A registry is established in presentation architecture that provides a unique numeric identifier for the most commonly used media types. Logic checks a received print job and the accompanying form definition for a numeric identifier, a media name and a bin number in that order. Use of a numeric identifier eliminates ambiguity, caused by character matching, between a print job request and printer media availability. Logic then attempts to find a matching numeric media identifier, a matching media name or a matching media bin, in that order. If none of the identifiers are found, the print server directs the media request to the default bin of the printer.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
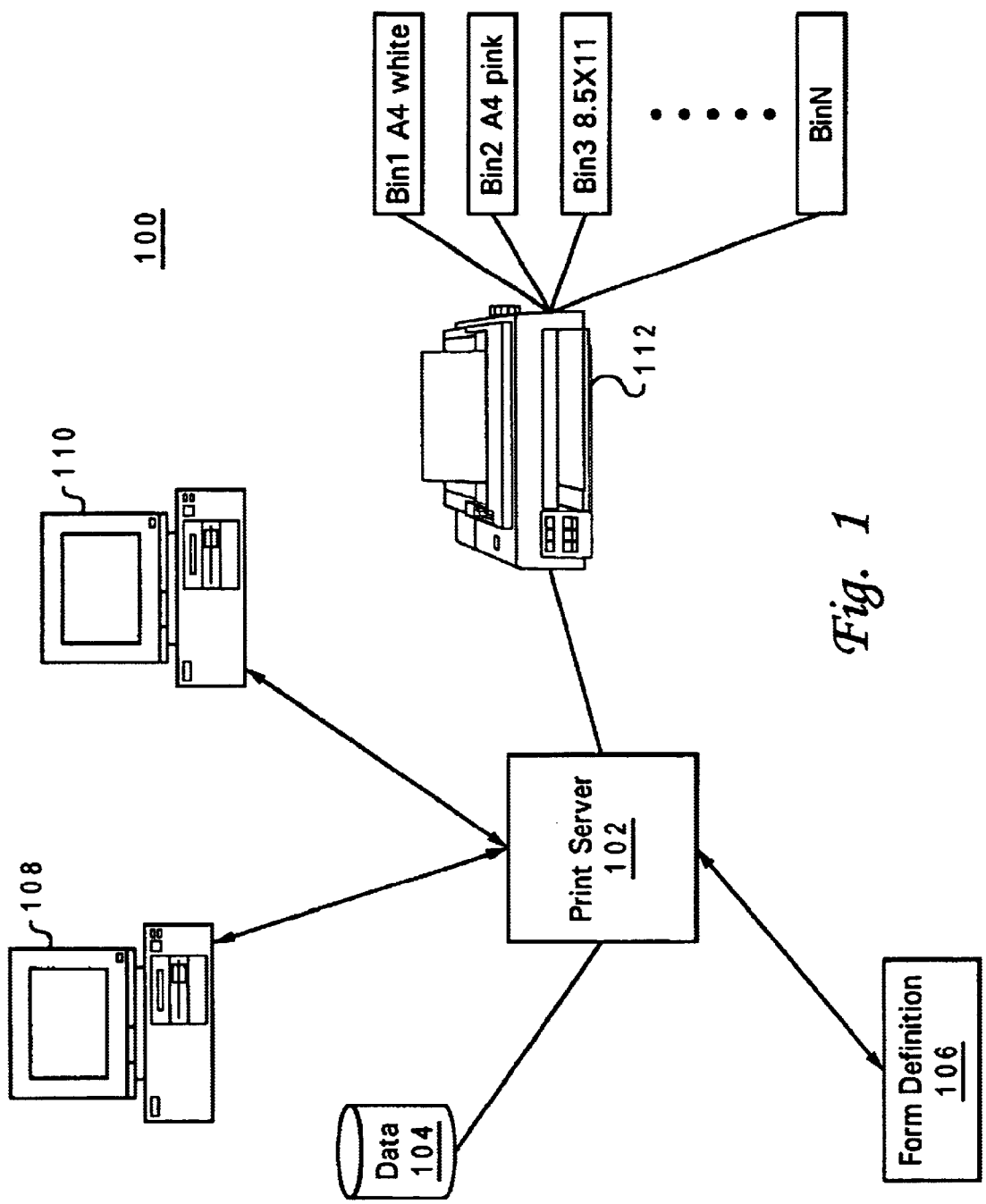
FIG. 1 depicts a high-level block diagram of a networked data processing system in which a preferred embodiment of the present invention may be implemented.

Referring now to the figures, and in particular to FIG. 1, a networked data processing system, in which the present invention can be employed is depicted. As shown, data processing system 100 comprises a number of components which are interconnected together through a basic network. Print server 102, computer systems 108 and 110, and data storage 104 are connected to form a rudimentary network wherein print server 102 serves printer 112 and computer systems 108 and 110.

A print job is sent from computer systems 108 or 110 to print server 102, which checks the application or form definition 106 for print media requirements. The form definition is generated by an external program and accompanies the print job to provide device control information such as simplex/duplex, etc., and identifiers for the required print media. Print server 102 queries printer 112 for the required media and printer 112 returns information regarding the media that is available. Generally, in current systems, media names and/or bin numbers are provided. If a media name is utilized, character matching introduces ambiguities and a wrong media may be used or a print job error may result even though the requested media is available. If bin numbers are used, operator error may result in the incorrect media being loaded into the selected bin and a print job error may result even though the requested bin is available.

Figure 2:
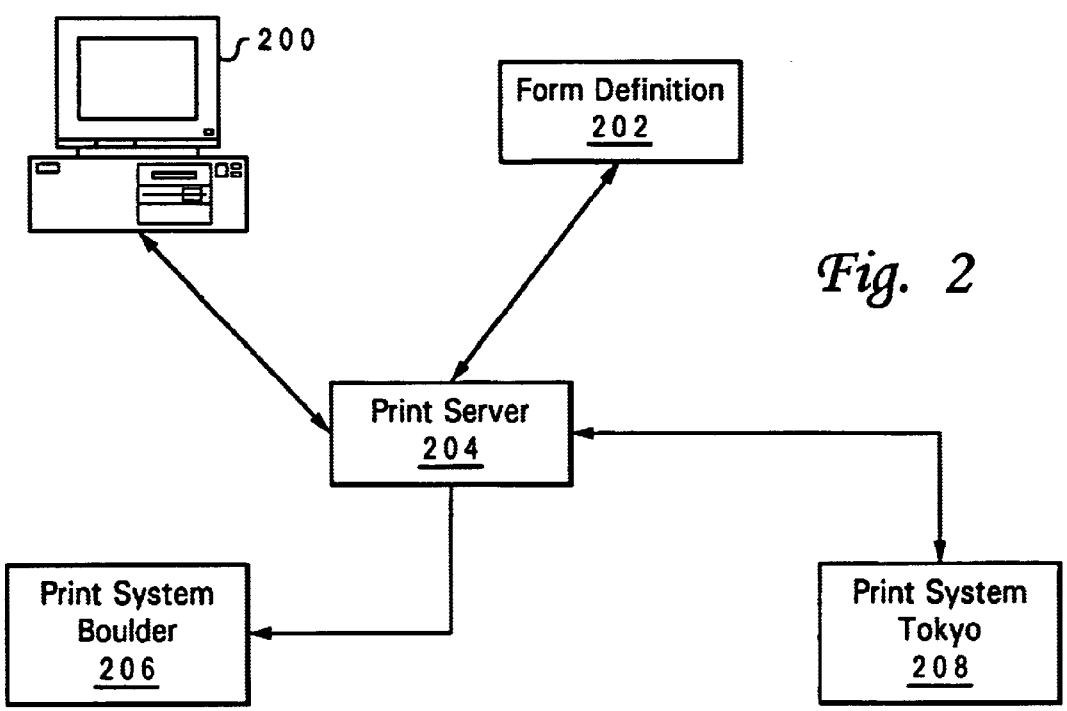
FIG. 2 is a block diagram of a print job being executed in accordance with a preferred embodiment of the present invention.

Referring to FIG. 2, a block diagram of a print job being executed in accordance with a preferred embodiment of the present invention, is illustrated. Many printing systems select a media type by name by comparing character strings in the request with character strings identifying the media type in the printer bin. This scheme suffers from the ambiguity problems inherent in character strings, such as A4 white is the same as A4. White to the user, but not to the logic matching characters.

Such problems are compounded when print jobs, with media name references are interchanged among systems in countries with different languages. Print server 204 may receive a print job request from computer system 200 that requires printing on a specific media in Boulder, Colo. and to a printing system in Tokyo, Japan. The print job is generated in the United States and references A4 white paper in the form definition as generated by an external Form Definition program 202. Print system Boulder 206 likely would have no problem, unless the stored media description was A4 White. However, as the print job is transmitted to Print system Tokyo 208, character strings may not be properly resolved due to language differences. Consequently the print job may not be executed or executed on the wrong media. Utilizing a universal identifier for common types of media would reduce or even eliminate the ambiguities presented by character matching.

Providing an identifier determined by an international standard would allow printing jobs to be carried out in many languages from a single location. Utilizing an International Standards Organization (ISO) hierarchy, or naming tree, to identify the more common types of print media would reduce the ambiguities present in character matching. For instance, Document Printing Application Standard provides for the exchange of information between office applications. A registry table, containing the media identifiers determined by the naming tree, would be present in Document Printing Application Standard for presentation to a print server that queried the printer to determine if a specific media were available.

Figure 3:
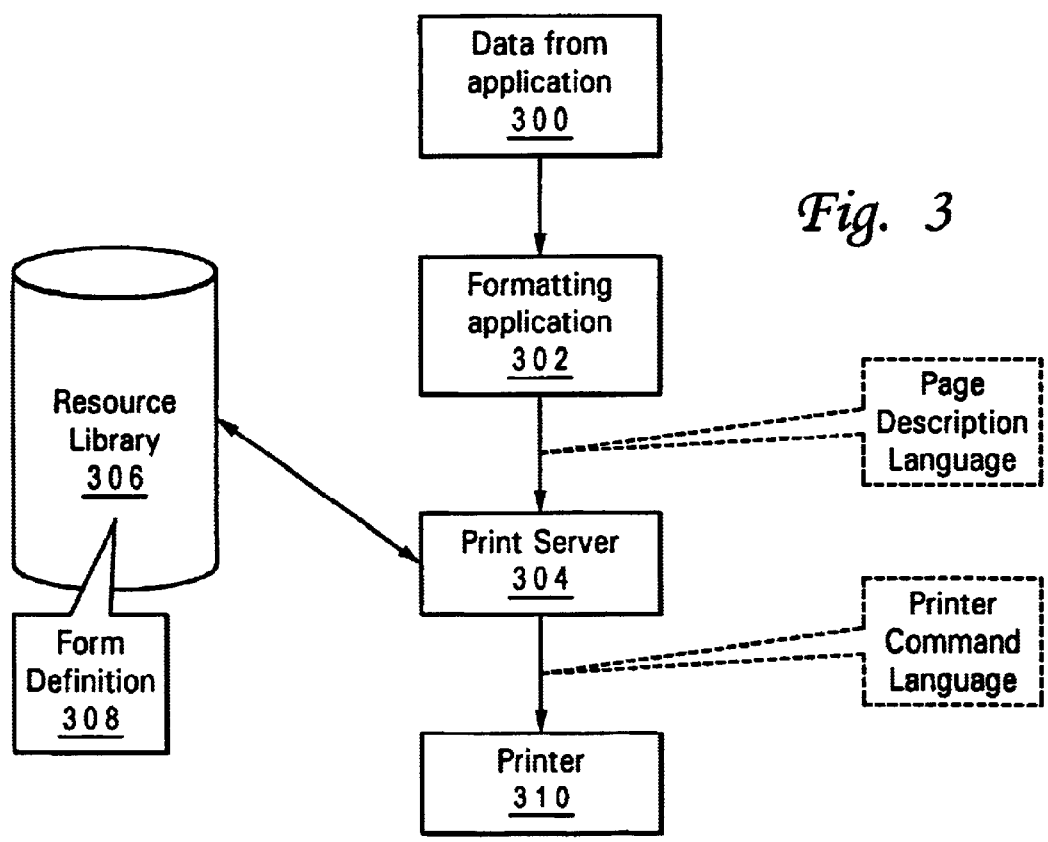
FIG. 3 depicts a high-level diagram for print flow in accordance with a preferred embodiment of the present invention.

Referring now to FIG. 3, a high-level diagram for print flow in accordance with a preferred embodiment of the present invention, is depicted. Data from an application program 300 generates data for a print job and sends the data to formatting application 302 which generates output for printing in the form of a Page Description Language (PDL) or presentation data stream. An example of a presentation data stream is Mixed Object Document Content Architecture for Presentation (MO):DCA-P), a product of International Business Machines (IBM) of Armonk, N.Y. This data stream is a device and resolution independent PDL.

The presentation data stream is sent to print server 304 and the print server processes the data stream utilizing form definition 308 from resource library 306. Alternatively, form definition information for the print job may be included in the presentation data stream and there would be no need to access the resource library to obtain form or media information.

Form Definition 308 ordinarily contains print control information such as whether the pages from the data stream should be printed only on one side of a sheet (simplex) or on both sides of a sheet (duplex). Form Definition 308 also contains information on the media required to print the presentation data stream. The information from form definition 308, along with other information, is utilized to transform the MO:DCA-P data stream into a printer directed data stream in printer command language. An example of printer command language would be Intelligent Printer Data Stream (IPDS)™, a product of IBM. The IPDS architecture permits a two-way dialogue between print server 304 and printer 310. This two-way dialogue provides for page-level error recovery. If printer intervention is required during the print job, printer 310 can resume printing at the next page in the job, so that no data is lost and the job does not have to be re-sent to printer 310.

If the presentation data stream contains references to resources required for printing, print server 304 performs any necessary transforms, gathers all necessary resources and sends the transformed data and the necessary resources to the printer in the printer command language transformed data stream.

Figure 4:
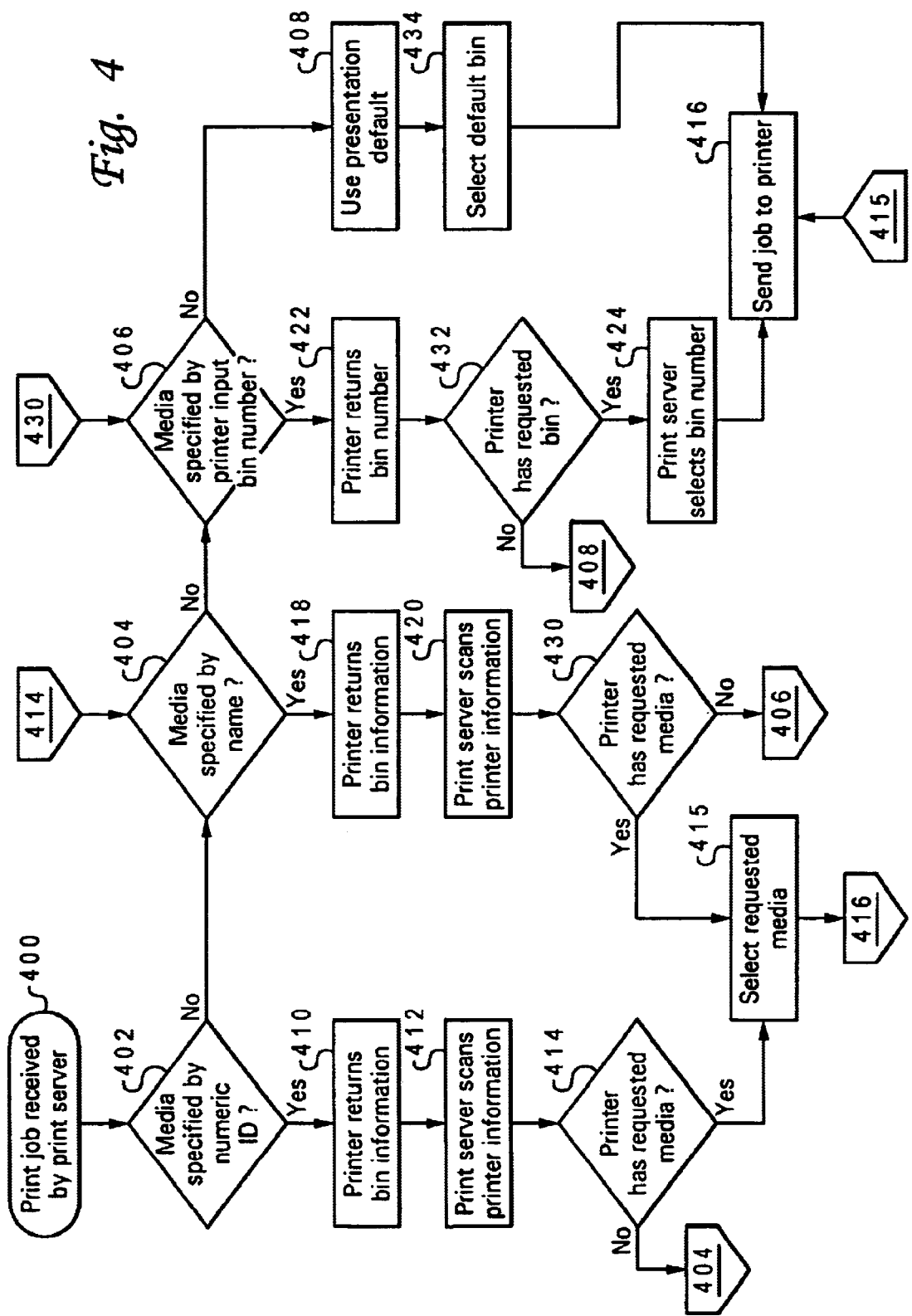
FIG. 4 illustrates a high-level flow diagram of a process for improving media selection in a printer system in accordance with a preferred embodiment of the present invention.

Referring to FIG. 4, a process for improving media selection in a printer system in accordance with a preferred embodiment of the present invention, is illustrated. The process begins with step 400, which depicts a print job being received by the print server. The process then moves to step 402, which illustrates a determination of whether a form definition accompanying the print job contains a numeric identifier of a specific media required for the print job. The form definition (formdef) is provided by an external application and within the formdef is an identifier for the media required for the print job. The identifier is a universally unique number registered for the media type in the presentation architecture. In the MO:DCA architecture, the media type number, or component ID, is listed and available for checking against formdef ID's. Unused ID's are set aside for user defined media types if a medium is not specified in the architecture and may be added by the user.

The partial table below is illustrative of the, numeric identifier registry in MO:DCA architecture. Only a few component ID's are shown and any media not present in the architecture table may be added by a user. The description and implementation of the table is not intended to limit the present invention to the MO:DCA architecture and is intended only as an example. The invention clearly contemplates utilizing a group of pre-defined ID numbers corresponding to common media in an accessible format and allowing for additions to the group as different media is ascertained.

| ID | Media Name | Media type | Encoded OID |
|---|---|---|---|
| 0 | ISO A4 | ISO A4 white | X '6072B120004030100' |
| 1 | ISO A4 CO | ISO A4 colored | X '6072B120004030101' |
| 2 | ISO A4 TR | ISO A4 transparent | X '6072B120004030102' |
| 3 | ISO A4 THD | ISO A4 1/3 A4 | X '6072B120004030103' |
| ... | ... | ... | |
| 11 | ISO A3 | ISO A3 white (297 × 420 mm) | X '6072B120004030104' |
| 50 | Letter | North American White | X '6072B120004030132' |

-continued

| ID | Media Name | Media type | Encoded OID |
|---|---|---|---|
| 79 | C5 ENV | C5 envelope (229 × 162 mm) | X '6072B12000403014F' |
| ... | ... | ... | ... |
| 151 | US PC | US postcard | X '6082B12000403018118' |

If the formdef contains a numeric identifier, the process passes to step 410, which depicts the printer returning media bin information which may include media name and identifier. The process proceeds to step 412, which illustrates the print server scanning the printer transmitted return information to determine if the printer contains the required media identifier and if so, the bin number for the media. The process then passes to step 414, which depicts the print server determining whether a printer contains the required media, and if so, the bin number containing the required media. If the determination is made that the media is present, the process proceeds to step 415, which illustrates selection of the media. Next, the process passes to step 416, which illustrates the print server sending the print job to the printer. If the: determination is made that the required media identifier is not present in the target printer, the process instead passes to step 404. Although not depicted in this figure, if the media requested is not in the printer, the system may be prompted, or can be automatically set to search any other printers on the network before canceling the print job.

Returning to step 402, if the media is not specified by numeric identifier in the formdef, the process passes to step 404, which illustrates a determination by the print server of whether the required media is specified by name in the formdef. If the media is specified by name in the formdef, the process proceeds to step 418, which depicts the printer returning media bin information which may include the media name. The process then passes to step 420, which illustrates the print server scanning the printer transmitted return information to determine if the printer contains the required media name and if so, the bin number. The process continues to step 430, which depicts the print server determining whether a printer bin contains the required media. If the determination is made that the media is present, the process proceeds to step 415, which illustrates selection of the media. The process then proceeds to step 416, which illustrates the print server sending the print job to the printer. If the determination is made that the required media name is not present in the target printer, the process instead passes to step 406. At this point, the logic may be set to search other printers, an operator's choice, on the system before going to the alternate choices of media in the targeted printer.

Returning to step 404, if the media is not specified by name in the formdef, the process passes to step 406, which illustrates a determination of whether the required media for the print job is specified by bin number in the formdef. If the required media is identified by bin number, the process passes to step 422, which depicts the printer returning the bin number available at the printer. The process continues to step 432, which depicts the print server determining whether the target printer has the requested bin. If the determination is made that the requested bin is available, the process proceeds to step 424, which illustrates the print server selecting the requested bin and then sending the print job to the printer. If the determination is made that the required bin is not present in the target printer, the process instead passes to step 408. Here again, the choice may be made by the operator to search other printers on the network instead of utilizing media from the default printer bin.

Returning to step 406, if the determination is made that the bin is not specified in the formdef, the process proceeds instead to step 408, which illustrates the print server utilizing the print presentation system default. The process proceeds to step 434, which depicts the print server selecting a default bin. The process then proceeds to step 416 which illustrates the print server sending the print job to the printer.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as read only memories (ROMS) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for improving media selection in a data processing system having at least one printer connected to a network, the method comprising the steps of:

providing predetermined, numeric media identifiers within document presentation architecture in said data processing system;

responsive to a print request from said data processing system, determining whether a form definition associated with said print request specifies a numeric identifier, a descriptive name, a printer bin number or no identifier; and supplying a print server with information from said printer regarding a media source with associated bin information including bin number, media name and numeric media identifier.

2. The method of claim 1, further comprising:

responsive to a signal from said printer that said requested media is unavailable, sending a notification to requester of said print job whether to query alternate printers on said network for availability of said media.

3. The method of claim 2, further comprising:

sending said print job to a second printer on said network as defined by said requester of said print job.

4. The method of claim 1, wherein the step of providing predetermined, numeric media identifiers within document presentation architecture in said data processing system, further comprises:

establishing an identifier registry in said presentation architecture;

installing a unique, numeric identifier for each commonly available media type;

reserving unused numeric identifiers for user defined media types; and adding said user defined media types to said registry.

5. The method of claim 1, wherein the step of determining whether a form definition associated with said print request specifies a numeric identifier, a descriptive name, a printer bin number or no identifier, further comprises:
querying said print request for media requirement; searching first for said numeric identifier; if no said numeric identifier, searching for said descriptive name;
if no said descriptive name, searching for said printer bin number; and
if no said printer bin number, sending said print request to printer default bin.

6. The method of claim 1, wherein the step of supplying said print server with information from said printer regarding a media source with associated bin information including bin number, media name and numeric media identifier, further comprises:
receiving a signal from said printer containing said numeric identifier for said media source wherein said signal includes bin information for said media; and
sending said print request to said printer.

7. In a network, a data processing system comprising:
at least one printer system connected to said data processing system through said network;
a printer server connected to said network;
numeric media identifiers stored within document presentation architecture in said data processing system;
program logic associated with said printer server for determining whether a form definition associated with a print request specifies a numeric identifier, a descriptive name, a printer bin number or no identifier; and
logic associated with said printer for supplying said print server with information from said printer regarding a media source with associated bin information including bin number, media name and numeric media identifier.

8. The data processing system of claim 7, further comprising:
logic for sending a notification to requester of said print job, in response to a signal from said printer that said requested media is unavailable, whether to query alternate printers on said network if requested media is unavailable from said printer.

9. The data processing system of claim 8, further comprising:
program logic for sending said print job to a second printer on said network as defined by said requester of said print job.

10. The data processing system of claim 7, wherein numeric media identifiers stored within document presentation architecture in said data processing system, further comprises:
a registry in said presentation architecture for media types;
a unique, numeric identifier associated with each commonly available media type; and
reserved numeric identifiers for addition of new, non-registered media types.

11. The data processing system of claim 7, wherein program logic for determining whether a form definition associated with said print request specifies a numeric identifier, a descriptive name, a printer bin number or no identifier, further comprises:
means for querying said print request for media requirement;
logic means for searching fist for said numeric identifier, then searching for said descriptive name if no said identifier, then searching for said printer bin number if no said descriptive name; and
logic means for sending said print request to printer default bin if no said printer bin number.

12. The data processing system of claim 7, wherein program logic for supplying said print server with information from said printer regarding a media source with associated bin information including bin number, media name and numeric media identifier, further comprises:
means for receiving a signal from said printer containing said numeric identifier for said media source wherein said signal includes bin information for said media; and
program logic means for sending said print request to said printer.

13. A computer program product within a data processing system network having at least one printer connected to said network, comprising:
instructions within said computer readable medium for providing predetermined, numeric media identifiers within document presentation architecture in said data processing system;
instructions within said computer readable medium for determining whether a form definition associated with a print request specifies a numeric identifier, a descriptive name, a printer bin number or no identifier; and
instructions within said computer readable medium for supplying a print server with information from said printer regarding a media source with associated bin information including bin number, media name and numeric media identifier.

14. The computer program product of claim 13, further comprising:
instructions within said computer readable medium for responding to a signal from said printer that said requested media is unavailable, by sending a notification to requester of said print job whether to query alternate printers on said network for availability of said media.

15. The computer program product of claim 14, further comprising:
instructions within said computer readable medium for sending said print job to a second printer on said network as defined by said requester of said print job.

16. The computer program product of claim 13, wherein the step of providing predetermined, numeric media identifiers within document presentation architecture in said data processing system, further comprises:
instructions within said computer readable medium for establishing an identifier registry in said presentation architecture; and
instructions within said computer readable medium for installing a unique, numeric identifier for each commonly available media type instructions within said computer readable medium for reserving unused numeric identifiers for user defined media types; and
instructions within said computer readable medium for adding said user defined media types to said registry.

17. The computer program product of claim 13, wherein the step of determining whether a form definition associated with said print request specifies a numeric identifier, a descriptive name, a printer bin number or no identifier, further comprises:
instructions within said computer readable medium for querying said print request for media requirement;
instructions within said computer readable medium for searching first for said numeric identifier;

if no numeric identifier, instructions within said computer readable medium for searching for said descriptive name;

if no said descriptive name, instructions within said computer readable medium for searching for said printer bin number; and if no said printer bin number, instructions within said computer readable medium for sending said print request to printer default bin.

18. The computer program product of claim 13, wherein the step of supplying said print server with information from said printer regarding a media source with associated bin information including bin number, media name and numeric media identifier, further comprises:

instructions within said computer readable medium for receiving a signal from said printer containing said numeric identifier for said media source wherein said signal includes bin information for said media; and instructions within said computer readable medium for sending said print request to said printer.

* * * * *